US012751536B2

(12) United States Patent
Lee et al.

(10) Patent No.: US 12,751,536 B2
(45) Date of Patent: Oct. 6, 2026

(54) NAIL ART APPARATUS AND NAIL ART METHOD USING SAME

(71) Applicant: NAILTOCTOC CO., LTD., Anyang-si (KR)

(72) Inventors: Sang Gyu Lee, Gwangsan-gu (KR); Jang Yong Joo, Suwon-si (KR)

(73) Assignee: NAILTOCTOC CO., LTD., Anyang-si (KR)

( * ) Notice: Subject to any disclaimer, the term of this patent is extended or adjusted under 35 U.S.C. 154(b) by 245 days.

(21) Appl. No.: 18/705,229

(22) PCT Filed: Oct. 27, 2022

(86) PCT No.: PCT/KR2022/016614
§ 371 (c)(1),
(2) Date: Apr. 26, 2024

(87) PCT Pub. No.: WO2023/075469
PCT Pub. Date: May 4, 2023

(65) Prior Publication Data

US 2025/0000230 A1 Jan. 2, 2025

(30) Foreign Application Priority Data

Oct. 28, 2021 (KR) ........................ 10-2021-0145911

(51) Int. Cl.
*A45D 29/00* (2006.01)
*A45D 31/00* (2006.01)
(Continued)

(52) U.S. Cl.
CPC ........... *A45D 29/001* (2013.01); *A45D 31/00* (2013.01); *G06F 3/0488* (2013.01); *G06Q 20/18* (2013.01);
(Continued)

(58) Field of Classification Search
None
See application file for complete search history.

(56) References Cited

U.S. PATENT DOCUMENTS 6,067,996 A * 5/2000 Weber ...................... B41J 3/407 132/73
6,959,284 B1 * 10/2005 Howes .................. G06Q 40/04 705/26.81
(Continued)

FOREIGN PATENT DOCUMENTS

CN 102774135 A 11/2012
JP 2002085148 A 3/2002
(Continued)

*Primary Examiner* — Nicholas D Lucchesi
(74) *Attorney, Agent, or Firm* — SZDC Law PC

(57) ABSTRACT

An invention related to a nail art apparatus and a nail art method using the same is disclosed. The disclosed nail art apparatus comprises: a nail measurement device for measuring the shape of a nail input through a hand input opening formed on the front surface of a main body; a touchscreen for displaying the shape of the nail measured by the nail measurement device, displaying a nail design and color desired by a user, and inputting information about the nail design and color; a printer for printing a nail design and color according to the shape of the nail measured by the nail measurement device; a sticker supplier for supplying a nail sticker selected by the user through the touchscreen; an artificial nail supplier for supplying an artificial nail selected by the user through the touchscreen; a payment module for receiving payment for the cost of nail art; and a controller for controlling the constituent devices. In a nail art method using same, image processing technology is used to distinguish a nail area on the basis of a hand image taken by a three-dimensional nail measurement device, and a nail art
(Continued)

image selected by the user is directly printed on the user's nail or printed on an artificial nail so as to be attached to the nail.

9 Claims, 6 Drawing Sheets

(51) Int. Cl.

| | |
|---|---|
| ***G06F 3/0488*** | (2022.01) |
| ***G06Q 20/18*** | (2012.01) |
| ***G06T 7/13*** | (2017.01) |
| ***G06T 7/194*** | (2017.01) |
| ***G06T 7/70*** | (2017.01) |
| ***G06T 17/20*** | (2006.01) |
| ***G06V 10/26*** | (2022.01) |
| ***G06V 10/44*** | (2022.01) |
| ***G06V 40/10*** | (2022.01) |

(52) U.S. Cl.
CPC ................ *G06T 7/13* (2017.01); *G06T 7/194* (2017.01); *G06T 7/70* (2017.01); *G06T 17/20* (2013.01); *G06V 10/26* (2022.01); *G06V 10/44* (2022.01); *G06V 40/107* (2022.01); *A45D 2029/005* (2013.01); *G06T 2207/30196* (2013.01)

(56) References Cited

U.S. PATENT DOCUMENTS

| | | | | |
|---|---|---|---|---|
| 2002/0010528 | A1* | 1/2002 | Bartholomew | B05B 15/50 700/239 |
| 2005/0147955 | A1* | 7/2005 | Giacchetti | G06Q 30/02 434/377 |
| 2005/0150508 | A1* | 7/2005 | Downs | A45D 44/005 132/73 |
| 2006/0195369 | A1* | 8/2006 | Webb | G06Q 30/0603 705/26.81 |
| 2013/0117137 | A1* | 5/2013 | Klein | G07F 17/26 705/16 |
| 2013/0173287 | A1* | 7/2013 | Cashman | H04N 7/141 705/2 |
| 2016/0309877 | A1* | 10/2016 | Papshev | B33Y 30/00 |
| 2017/0072702 | A1* | 3/2017 | Collett | B41J 3/445 |
| 2018/0242708 | A1* | 8/2018 | Felzer | A45D 31/00 |
| 2019/0159571 | A1* | 5/2019 | Shiga | G06Q 30/0621 |
| 2020/0107627 | A1* | 4/2020 | Nagao | B41J 19/207 |
| 2021/0120935 | A1* | 4/2021 | Shashou | A45D 29/20 |
| 2021/0211557 | A1* | 7/2021 | Walia | A45D 44/005 |
| 2023/0112663 | A1* | 4/2023 | Brown | B25J 19/023 132/200 |
| 2023/0124480 | A1* | 4/2023 | Farran | G06V 10/44 703/1 |

FOREIGN PATENT DOCUMENTS

| | | | | | |
|---|---|---|---|---|---|
| JP | 2003331355 | A | | 11/2003 | |
| JP | 2006204647 | A | | 8/2006 | |
| JP | 2012232039 | A | | 11/2012 | |
| JP | 2015186565 | A | | 10/2015 | |
| JP | 2017164394 | A | | 9/2017 | |
| JP | 2021048923 | A | | 4/2021 | |
| KR | 10-2000-0075428 | A | | 12/2000 | |
| KR | 1-2004-0060776 | A | | 7/2004 | |
| KR | 10-2011-0125967 | A | | 11/2011 | |
| KR | 10-2016-0119771 | A | | 10/2016 | |
| KR | 10-1669994 | B1 | | 10/2016 | |
| KR | 20200119926 | A | | 10/2020 | |
| KR | 10-2021-0064442 | A | | 6/2021 | |
| KR | 20210064442 | A | * | 6/2021 | G06T 7/187 |
| KR | 10-2021-0082128 | A | | 7/2021 | |
| KR | 10-2021-0117471 | A | | 9/2021 | |
| KR | 20210117471 | A | * | 9/2021 | A61M 37/0076 |

* cited by examiner

NAIL ART APPARATUS AND NAIL ART METHOD USING SAME

This application is the National Stage Application of PCT/KR2022/016614, filed on Oct. 27, 2022, which claims priority to Korean Patent Application No. KR 10-2021-0145911, filed on Oct. 28, 2021, which is incorporated by reference for all purposes as if fully set forth herein.

TECHNICAL FIELD

The present invention relates to a nail art apparatus and a nail art method using the same. The present invention more specifically relates to a nail art apparatus and a nail art method using the same that are capable of allowing nail regions to be distinguished through image processing technology, based on the hand image taken through a three-dimensional nail measuring part, printing nail art images selected by a customer (user) directly on his or her nails or on artificial nails or nail stickers attached to his or her nails.

BACKGROUND ART

As interest in beauty has been increased rapidly, recently, interest in nail or toe nail art has been increasingly developed.

To perform such nail art, first, nails and regions around the nails are cleaned up, and then, the nails are printed. To apply artistic expressions to the nails, further, pictures are drawn on the long nails or beads or rhinestones are attached to the nails.

A variety of technologies for nail art are developed, and as the examples of such technologies, there are Patent documents 1 to 3 as will be discussed below.

The Patent document 1 discloses a nail art device that recognizes the contours of nails through a contour recognizing part, three-dimensionally analyzes and displays the shapes of the nails whose unevenness (凹凸) is recognized by an unevenness recognizing part through a three-dimensional display part, checks the information combined, through the three-dimensional display part, with the shapes selected or the shapes taken by a user through a coordinate input part, and prints the nails through a printing part.

The Patent document 2 discloses a nail art surgery device that applies ink onto a plate on which concave portions are formed, transfers the ink existing on the concave portions of the plate to pads, and re-transfers the ink transferred to the pads to nails, the device including a fingertip fixing part for fixing fingertips of a customer, a plate selection part for selecting the plate to be used from a plurality of plates, a plate transfer part for moving the plate selected through the plate selection part along a working plate, an ink dropping part for selecting the ink from a plurality of ink containers where the ink is stored and dropping the selected ink beside the plate being transferred through the plate transfer part, an ink applying part for applying the ink dropped beside the plate through the ink dropping part to the plate, and a printing part for transferring the ink applied to the plate through the ink applying part to the pads, allowing the pads to come into contact with the nails of the customer's fingertips fixed to the fingertip fixing part, and re-transferring the ink to the nails to print the nails.

The Patent document 3 discloses a nail art system including a controller having various nail art patterns and nail art control programs, a printer connected to the controller to print the nail art patterns selected by a user on the user's nails, and a display part for displaying menu and art patterns on a screen under the control of the controller, individually or integratedly, wherein the nail art system includes a contact part for sensing the entry of a member's fingers and contacts with fingerprints, one or more cameras for taking the member's nail images in the opposite direction to the contact part when the contact part senses the contacts with the fingerprints, an image acquiring part for imaging given patterns provided by the member at the insides of the nail regions checked among the nail images taken by the cameras and acquiring the image information of the given patterns, a storage part for storing the image information acquired through the image acquiring part that is edited by the controller, and the controller for displaying the nail images taken by the cameras, checking the nail regions on which the given patterns are printed among the nail images, displaying the image information of the given patterns acquired through the image acquiring pat on the display part, and arranging the edited image information to be stored in the storage part on the insides of the nail regions.

Such various conventional nail art technologies have been developed, but they have limitations in the selection range of the user, thereby failing to provide the nail art with a variety of materials.

Therefore, there is a definite need to develop a nail art apparatus capable of providing nail art with a variety of materials.

PRIOR ART DOCUMENT

Patent Document (Patent document 1) Korean Patent Application Laid-open No.10-2000-0075428

(Patent document 2) Korean Patent Application Laid-open No.10-2004-0060776

(Patent document 3) Korean Patent Application Laid-open No.10-2011-0125967

DISCLOSURE OF THE INVENTION

Technical Problems

Accordingly, the present invention has been made in view of the above-mentioned problems occurring in the related art, and it is an object of the present invention to provide a nail art apparatus and a nail art method using the same that are capable of performing nail art with various materials. That is, it is an object of the present invention to provide a nail art apparatus and a nail art method using the same that are capable of allowing nail regions to be distinguished through image processing technology, based on the hand image obtained through a three-dimensional nail measuring part, printing nail art images selected by a customer (user) directly on his or her nails or combining the images selected by the customer (user) with artificial nails or nail stickers attached to his or her nails, and printing his or her desired designs on the nails through base, color and varnish painting, thereby providing various nail art products for printing his or her desired designs for him or her.

Technical Solutions

To accomplish the above-mentioned objects, according to one aspect of the present invention, there is provided a nail art apparatus including: a nail measurement part for measuring the shapes of the nails inserted through a hand inlet formed on the front surface of a body to obtain data for printing various colors or patterns on the nails; a touchscreen for displaying the shapes and colors of the nails measured by the nail measurement part, displaying nail designs and colors desired by a user, and inputting information of the nail designs and colors; a printer for printing the nail designs and colors according to the shapes of the nails measured by the nail measurement part; a sticker supplier for supplying nail stickers selected by the user through the touchscreen; an artificial nail supplier for supplying artificial nails selected by the user through the touchscreen; a payment module for receiving payment for the cost of nail art; and a controller for controlling all of the parts thereof.

The printer may perform printing in order of base, color, and varnish paints.

The sticker supplier may include a sticker rack on which the nail stickers are loaded, a rack elevator for elevating the sticker rack, and a horizontal transfer part for transferring the nail stickers of the sticker rack moving up through the rack elevator to an outlet or the hand inlet.

The artificial nail supplier may include an artificial nail loader on which the artificial nails are loaded and a horizontal artificial nail transferrer for pushing and transferring the artificial nails loaded on the artificial nail loader to an upward and downward transfer loader located in front thereof.

The upward and downward transfer loader may include a product support plate for supporting the artificial nails pushed through the horizontal artificial nail transfer part and an elevator for elevating the product support plate.

The nail art apparatus may further include a communication module for performing remote control through a mobile application or web server.

The nail art apparatus may display a warning message if the selected nail colors are erroneously printed.

To accomplish the above-mentioned objects, according to another aspect of the present invention, there is provided a nail art method using the nail art apparatus according to the present invention, the nail art method including the steps of: the hand imaging step of imaging the user's hand through a camera or scanner of the nail measurement part to acquire a hand image and hand position data; the hand region extracting step of removing the background region excepting the hand from the data acquired in the hand imaging step to extract hand edges; the nail region extracting step of extracting only portions where nails exist from the hand region extracted in the hand region extracting step through an image data cleansing program; the nail position information extracting step for extracting the positions of the nail regions from the image extracted in the nail region extracting step; the image mating step of mating the images for the nail art that are pre-selected by the user to the regions of the nail position information through the position information extracted in the nail position information extracting step; and the image output step of transmitting the image mating data obtained in the image mating step to the printer to allow the printer to produce the images for nail art.

In the hand region extracting step, the hand edges may be extracted from the hand region extracted by removing the background region from the image on which a value of an axis Z (height data) of the three-dimensional mesh data validated by three-dimensional mesh modelling is corrected to a desired size.

The nail art method may allow a communication module to perform remote control through a mobile application or web server.

Advantageous Effects of the Invention

According to the present invention, the nail art apparatus automatically performs the printing on the nails accurately and simultaneously performs the curing for the printed paint with the ultraviolet rays generated from the LED lamps, thereby providing fun and beauty for nail art customers in a simple, easy, fast, and inexpensive manner.

Further, the nail art apparatus according to the present invention supplies the artificial nails and the nail stickers to the user's nails, combines the nail images selected by the user with the artificial nails or the nail stickers, and prints the user's desired designs on the artificial nails or the nail stickers through the base, color, and varnish painting, thereby providing various nail art products for the user.

Furthermore, the nail art apparatus according to the present invention is configured as a kiosk vending machine, so that various nail accessories (rhinestones, pearl balls, etc.) as a package are sold, thereby upgrading beauty as well as the interesting/fun of the nail art.

MODE FOR INVENTION

Figure 1:
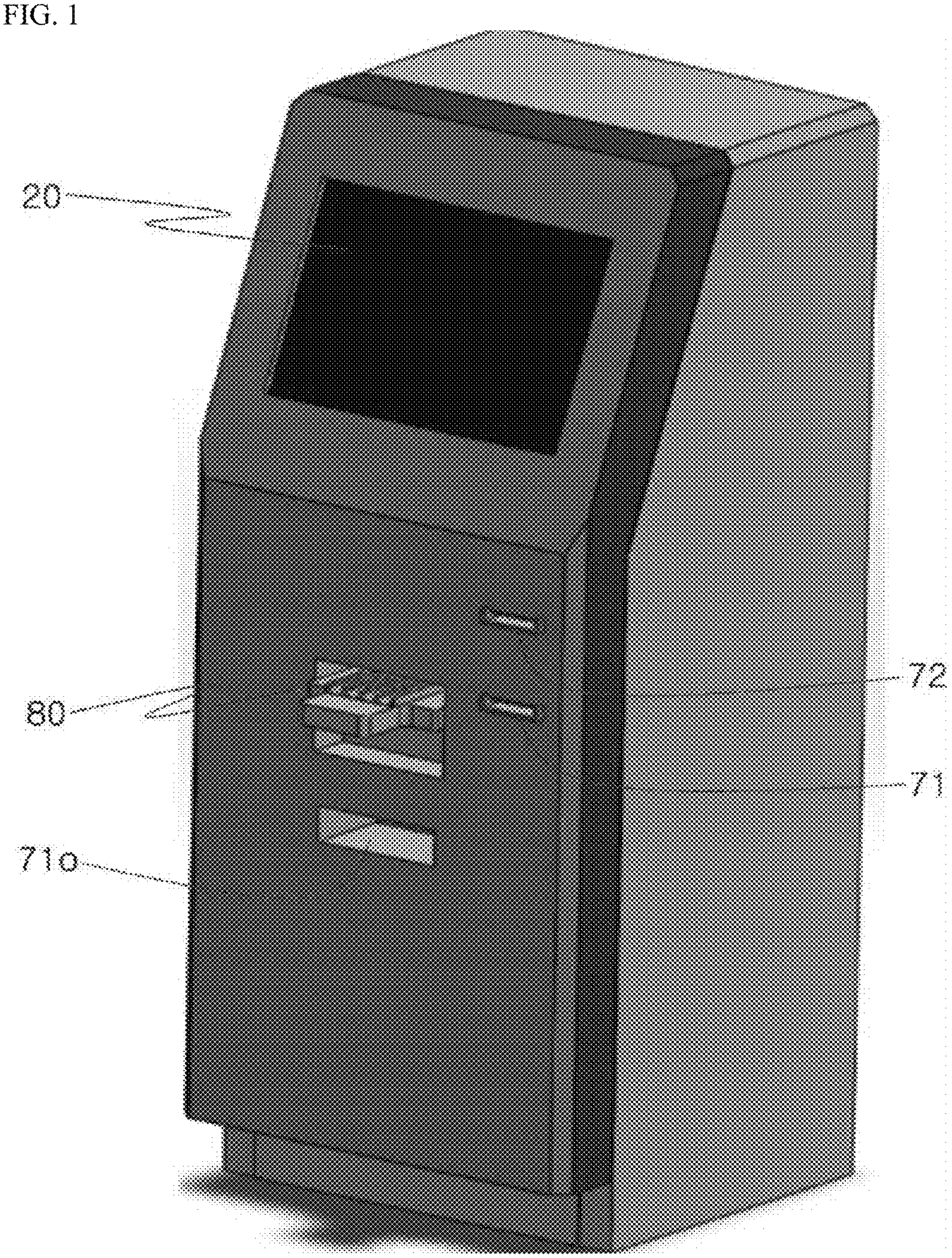
FIG. 1 is a perspective view showing a nail art apparatus according to the present invention.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

The corresponding parts in the embodiments of the present invention are indicated by corresponding reference numerals. If it is determined that the detailed explanation on the well-known technology related to the present invention makes the scope of the present invention not clear, the explanation will be avoided for the brevity of the description.

The present invention allows nail regions to be distinguished through image processing technology, based on the hand image taken, to print nail art images selected by a user on the distinguished nail regions or attach artificial nails to his or her nails.

Figure 2:
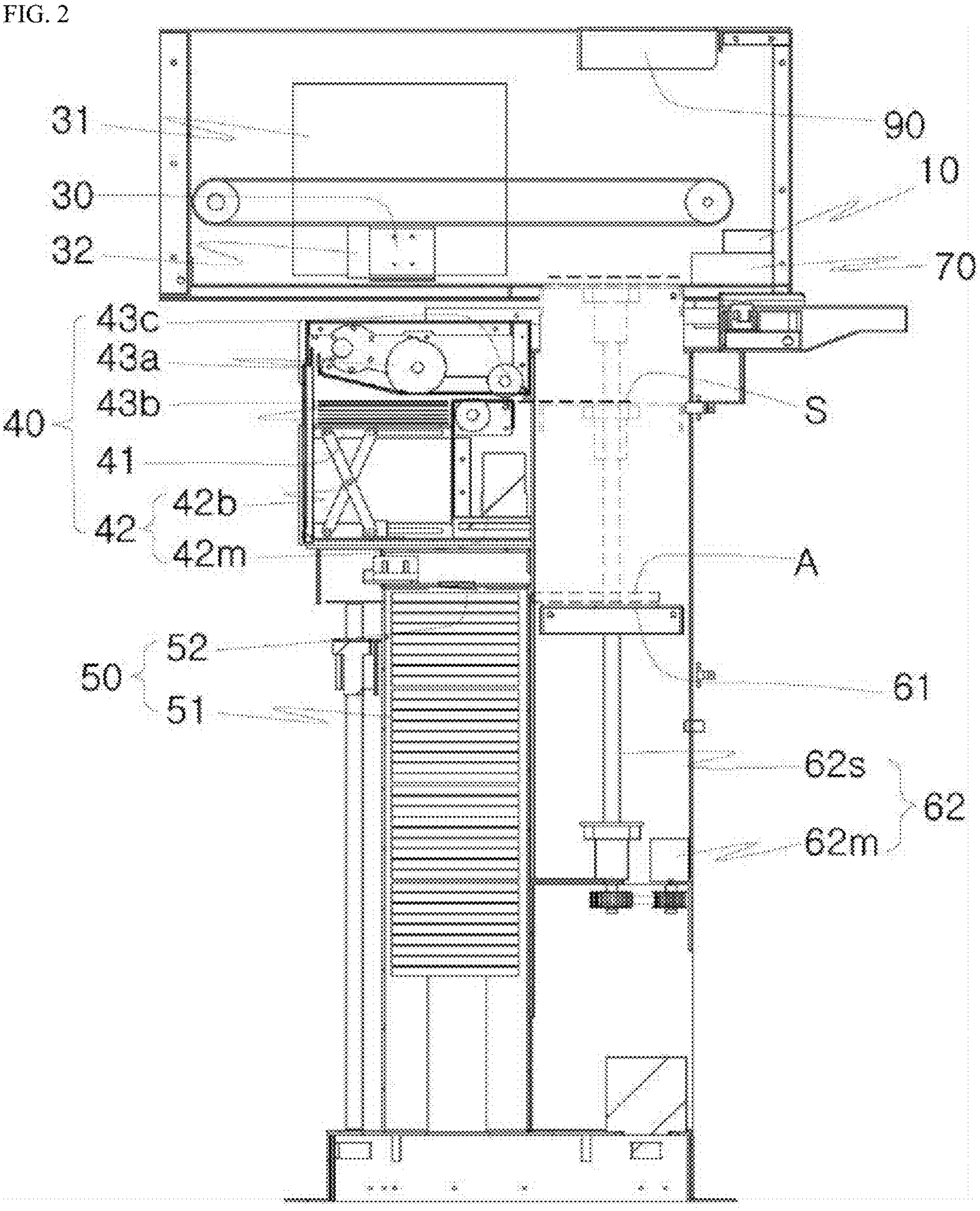
FIG. 2 is a side view showing a state where a portion of the nail art apparatus according to the present invention is removed.

As shown in FIGS. 1 and 2, a nail art apparatus according to the present invention includes: a nail measurement part 10 for measuring the shapes of the nails inserted through a hand inlet 80 formed on the front surface of a body looking like a kiosk to obtain data for printing various colors or patterns on the nails; a touchscreen 20 for displaying the shapes of the nails measured by the nail measurement part 10, displaying nail designs desired by a user, and inputting information of the nail designs; a printer 30 for printing the nail designs according to the shapes of the nails measured by the nail measurement part 10; a sticker supplier 40 for supplying nail stickers S selected by the user through the touchscreen 20; an artificial nail supplier 40 for supplying artificial nails A selected by the user through the touchscreen 20; a payment module 70 for receiving payment for the cost of nail art; and a controller 90 for controlling all of the parts thereof.

The nail measurement part 10 serves to measure the shapes of the nails and includes a camera or three-dimensional scanner for taking the nail images, lamps for providing light to the hand inserted through the hand inlet 80, and a software (S/W) program for processing the image obtained through the camera or three-dimensional scanner to extract only nail regions. In this case, the nail measurement part 10 extracts the nail regions through the image processing, based on the hand image taken by the camera with the application of a moire pattern, and then supplies images combined to the nails and printing coordinate information to the printer to allow the nail images for nail art selected by the user to be printed on the user's nails.

The camera or three-dimensional scanner has been suggested as an example of a device for taking the nail images, but it is desirable that the three-dimensional scanner be used as the device for taking the nail images.

Of course, the nail images measured through the nail measurement part 10 are displayed on the touchscreen 20 and checked by the user.

The touchscreen 20, which is an input/output device, displays the nail images obtained through the nail measurement part 10, displays the images printed on the nails, and displays various designs of the nail images to allow the user to select his or her desired nail images.

Further, the touchscreen 20 has a function of receiving information for allowing the nail stickers S or artificial nails A supplied from the sticker supplier 40 or the artificial nail supplier 50 to be selected and sold separately. That is, the nail stickers S or artificial nails A supplied from the sticker supplier 40 or the artificial nail supplier 50 are outputted as attached to the user's nails or sold separately so that they are arbitrarily attached to the user's nails.

A main screen of the touchscreen 20 includes a nail art gallery for selecting nail tips whose styles, colors, and patterns are designated, a nail art making process for displaying a making process through the selection of the nail styles and patterns, a purchase screen for displaying sale accessories for nail art materials, such as line tapes, beads, parts, and the like.

Further, the touchscreen 20 has an initial screen for displaying important information and notice related to using the nail art apparatus to allow the user to recognize the displayed content.

Further, the nail art materials include nails, nail tips, and stickers.

Figure 6:
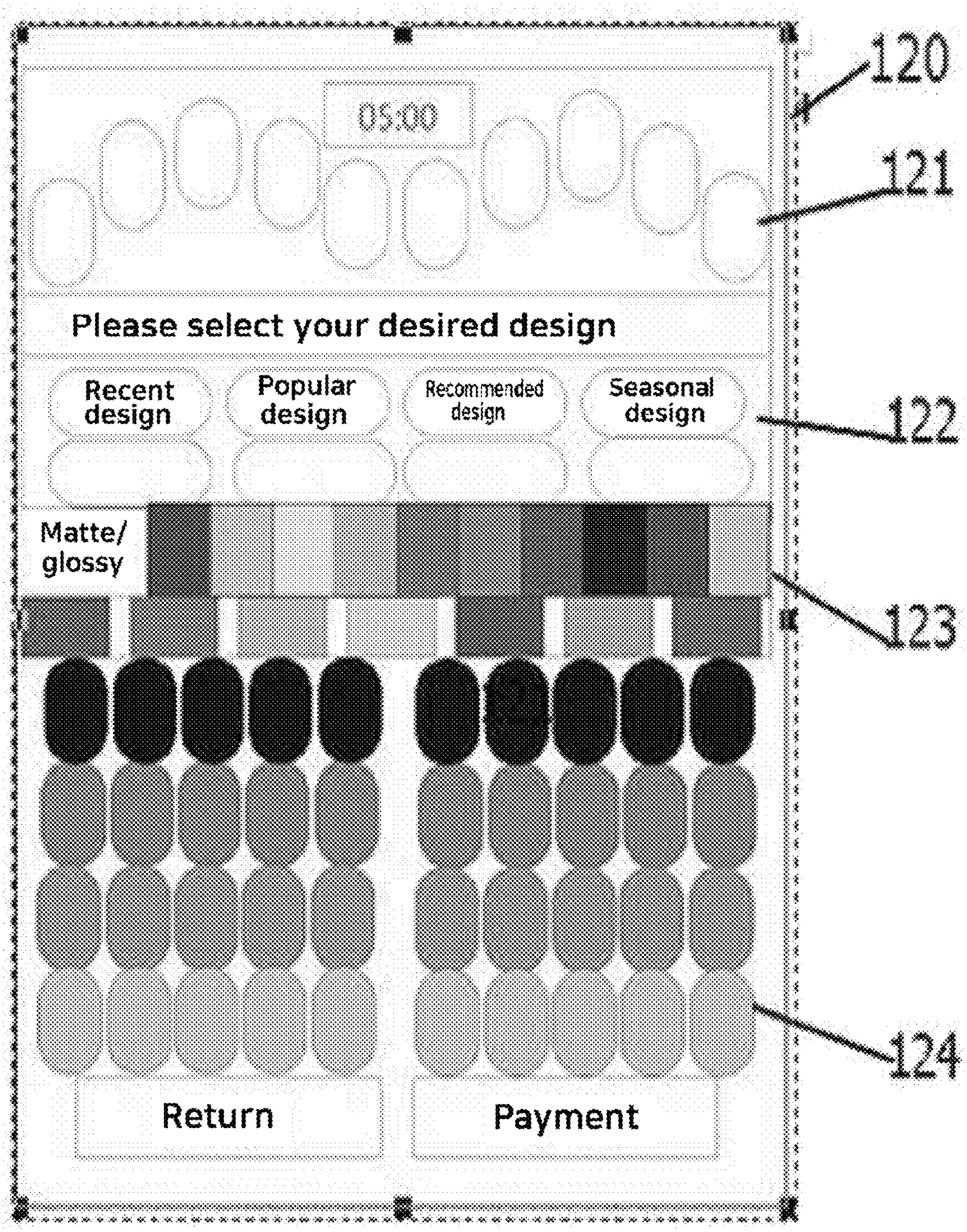
FIG. 6 shows an example of a selection menu display part for allowing a user to select completed nail tips or nail art to be made by him or her through the nail art apparatus according to the present invention.

Nail art making information includes the styles, patterns, and colors varied according to the user's selection. In this case, there are three basic styles (full coat, gradation, and French), there are about 40 color selection conditions including red, orange, yellow, etc. for selecting colors (glossy/matte), and there are recent, popular, seasonal, and event patterns. As shown in FIG. 6, the color changes of the pattern selected are made with one or more colors of about 40 colors (glossy/matte).

As shown in FIG. 6, that is, a selection menu display part 120 displays 10 nails through a preview display part 121 located on the upper end thereof to allow the 10 nails to be selected in colors on the spot, so that the 10 nails are immediately changed according to the selected colors.

Through a menu selection button part 122 located under the preview display part 121, recent, popular, recommended, and seasonal designs of the nail art are displayed to allow the user to select his or her desired event design.

Through a two-stage color bar display part 123 located under the menu selection button part 122, both of primary and secondary color bars are displayed upon first selection, and in this case, the primary colors of the color bar display part 123 include about 10 colors such as red, orange, yellow, green, blue, indigo, purple, black, white, and pink. Contrarily, the secondary colors include about 5 to 8 specific colors for each primary color. Such colors may be arbitrarily changed according to trends.

Further, nail tip display parts 124 each displaying 10 nail tips as one pack, which are located under the color bar display part 123, are freely arranged according to the user's preference, which will be fully understood through the embodiment of the present invention.

The printer 30 serves to print the nail images with the user's desired designs on his or her nails, artificial nails, or stickers and includes a plurality of paint (or ink) injection nozzles for performing base, color, and varnish painting, which are typically used in the off-line nail art.

For example, the printer 30 has six head nozzles consisting of one base painting nozzle, four color painting nozzles, and one varnish painting nozzle, and the head nozzles move in top, bottom, forward, backward, left and right directions (in directions of axes Z, X, and Y) to print the nail images on the nails, artificial nails, or stickers.

A curing part 32 is located on one side of the printer 30.

The curing part 32 serves to cure the printed nail image paint and includes vertical UV LED (V-LED) lamps. The vertical lamps (two to three lamps) are modularized with 20 LEDs having outputs of about 395 nanometers and built behind the printer head and on the gantry to adjust quantities of light upon the printing of the nail images and thus cure the printed nail image paint, so that the curing time of the base paint, the color paint, and the varnish paint is shortened and printed stripes are removed to upgrade a quality of print.

The sticker supplier 40 serves to supply the nail stickers S to be attached to the nails, and the nail stickers S supplied through the sticker supplier 40 are sold as attached to the user's nails or sold separately.

The sticker supplier 40 includes a sticker rack 41 on which the nail stickers S are loaded, a rack elevator 42 for elevating the sticker rack 41, and a horizontal transfer part 43 for transferring the nail stickers S of the sticker rack 41 moving up through the rack elevator 42 to a product outlet or the hand inlet.

The sticker rack 41 has the shape of a flat plate on which the nail stickers S are stacked, and the loaded nail stickers S are discharged to the product outlet (or the hand inlet) through the horizontal transfer part 43.

To allow the nail stickers S to be pushedly supplied to the horizontal transfer part 43, the rack elevator 42 is located on the underside of the sticker rack 41. The rack elevator 42 is freely varied in structure, but desirably, as shown in FIG. 2, the rack elevator 42 includes two rotating bars 42*b* rotatably located on the underside of the sticker rack 41 and a rotating bar operating part 42*m* for pushing or pulling the underside of one of the two rotating bars 42*b* to adjust the height of the sticker rack 41.

Under the above-mentioned configuration of the sticker supplier 40, if the rotating bars 42*b* operate through the operation of the rotating bar operating part 42*m* to allow the sticker rack 41 to move up, the uppermost nail sticker among the nail stickers S loaded on the sticker rack 41 is aligned with the outlet, and next, the corresponding nail sticker moves toward the outlet through the operation of the horizontal transfer part 43.

The rotating bar operating part 42*m* includes a screw shaft fixed to one side of one of the two rotating bars 42*b* by means of a hinge and a motor for rotating the screw shaft, and if the screw shaft rotates through the operation of the motor, the corresponding rotating bar is pushed or pulled and thus varied in standing angle, so that the sticker rack 41 is adjusted in height.

As shown in FIG. 2, the horizontal transfer part 43 consists of a plurality of rollers 43*a* to 43*c*.

As shown, the roller 43*a* located above the sticker rack 41 is a cam type roller having a relatively large diameter on which a sticker transferrer is formed, and if the sticker transferrer comes into contact with the sticker to push the corresponding sticker toward the outlet, the rollers 43*b* and 43*c* push and transfer the corresponding sticker toward the outlet sequentially.

The artificial nail supplier 50 serves to supply the artificial nails A to be attached to the nails, and the artificial nails A supplied through the artificial nail supplier 50 are sold as attached to the user's nails or sold separately.

The artificial nail supplier 50 includes an artificial nail loader 51 on which the artificial nails A are loaded and a horizontal artificial nail transfer part 52 for pushing and transferring the artificial nails A loaded on the artificial nail loader 51 to an upward and downward transfer loader 60 located in front thereof.

The artificial nail loader 51 serves to load the artificial nails A and has the shape of a loop closed on top and bottom in such a way as to have multi-stage storage spaces or the shape of an elevating plate moving up and down by means of an elevating means, and the artificial nails A loaded on top of the artificial nail loader 51 or stored therein are pushed and transferred to the outlet through the horizontal artificial nail transfer part 52.

The horizontal artificial nail transfer part 52 consists of a horizontal moving means such as an LM guide and a pushing plate located on one side of the moving means to push the artificial nails A.

The upward and downward transfer loader 60 is located on one side of the artificial nail supplier 50.

The upward and downward transfer loader 60 includes a product support plate 61 for supporting the artificial nails pushed through the horizontal artificial nail transfer part 52 and an elevator 62 for elevating the product support plate 61.

The elevator 62 is freely varied in structure. For example, as shown in FIG. 2, the elevator 62 consists of a screw shaft 62*s* rotatably disposed on the underside of the product support plate 61 and a motor 62*m* for rotating the screw shaft 62*s*.

The payment module 70 serves to receive payment for the cost of nail art and is provided as built typically in a vending machine, and as shown in FIG. 1, the payment module 70 includes card inlets 71 and 72 for inserting a credit card and cash and a mobile payment part 710.

As shown in FIG. 1, the hand inlet 80 is formed on the front surface of the nail art apparatus, and a plurality of grooves are formed on the hand inlet 80 to stably seat the user's fingers thereonto, so that in the processes of measuring the nails through the nail measurement part and printing the nail images on the nails, the fingers are prevented from moving.

Figure 4:
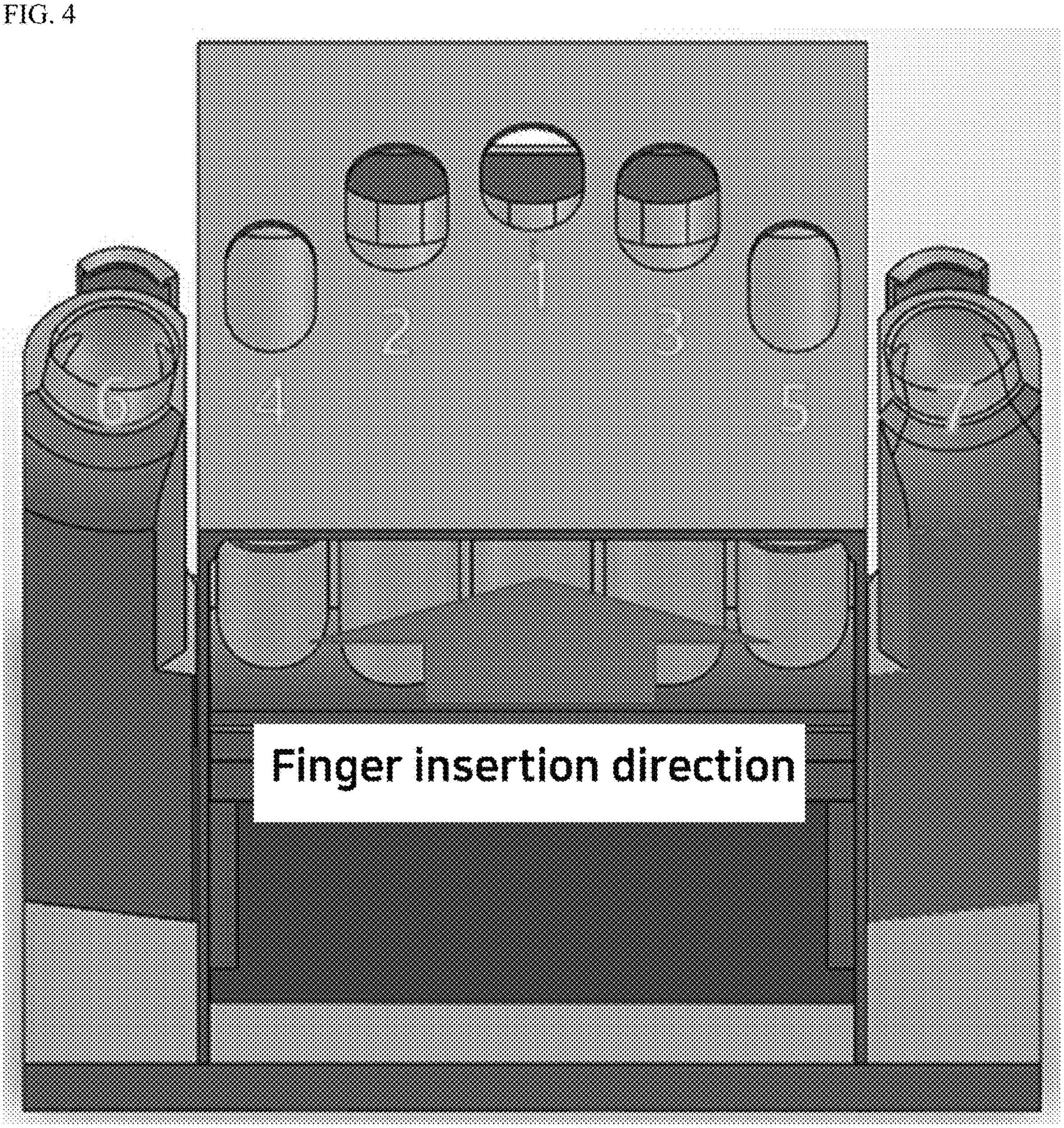
FIG. 4 is a front view showing nail inlets of the nail art apparatus according to the present invention.

As shown in FIG. 4, the hand inlet 80 has seven finger inlets formed therein. In the case of the left hand, the middle finger is located in the first finger inlet, the ring finger in the second finger inlet, the index finger in the third finger inlet, the little finger in the fourth finger inlet, and the thumb in the seventh finger inlet, and in the case of the right hand, the middle finger is located in the first finger inlet, the index finger in the second finger inlet, the ring finger in the third finger inlet, the little finger in the fifth finger inlet, and the thumb in the sixth finger inlet.

Figure 5:
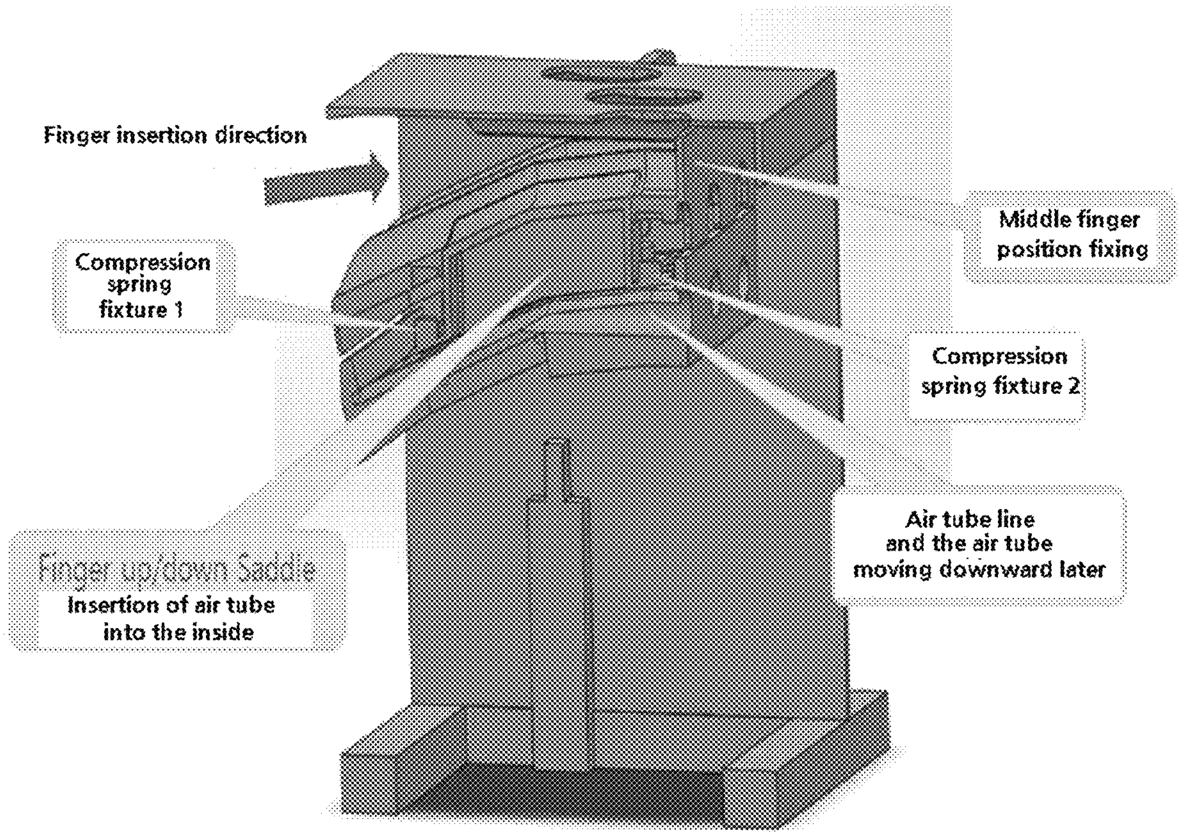
FIG. 5 is a longitudinal sectional view showing the nail inlets of the nail art apparatus according to the present invention.

As shown in FIG. 5, the hand inlet 80 has fixing means for fixing the fingers so that the fingers do not move, and the fixing means include a first fixture for fixing the portions of the fingers adjacent to the palm and a second fixture for fixing the ends of the fingers, and the first and second fixtures operate by means of compression springs and pressurizedly fix the fingers. Further, an air tube is located on the middle portion of the fingers, and as air is supplied to the air tube or discharged from the air tube, the fingers are fixedly located.

Now, an explanation of a nail art method performed through the nail art apparatus under the above-mentioned configuration will be given with reference to FIG. 3.

Figure 3:
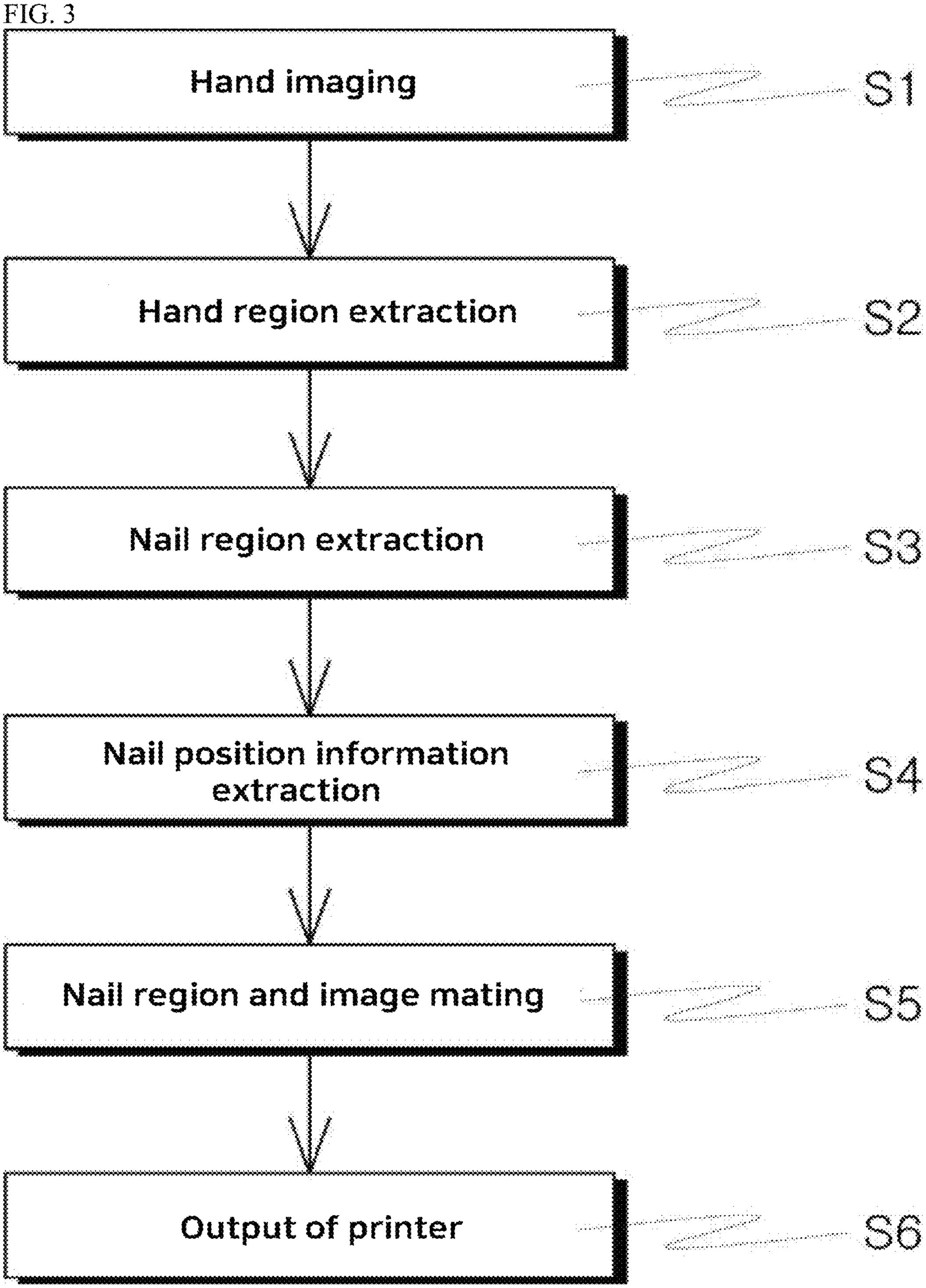
FIG. 3 is a flowchart showing a nail art method according to the present invention.

As shown in FIG. 3, the nail art method according to the present invention includes: the hand imaging step (S1) of imaging the user's hand through the camera or scanner of the nail measurement part to acquire a hand image and hand position data; the hand region extracting step (S2) of removing the background region excepting the hand from the data acquired in the hand imaging step (S1) to extract hand edges; the nail region extracting step (S3) of extracting only portions where nails exist from the hand region extracted in the hand region extracting step (S2) through an image data cleansing program; the nail position information extracting step (S4) for extracting the positions of the nail regions from the image extracted in the nail region extracting step (S3); the image mating step (S5) of mating the images for the nail art that are pre-selected by the user to the regions of the nail position information through the position information extracted in the nail position information extracting step (S4); and the image output step (S6) of transmitting the image mating data obtained in the image mating step (S5) to the printer to allow the printer to produce the images for nail art.

Of course, before the entire process is carried out, the user's desired nail art materials are selected through the touchscreen.

In the hand imaging step (S1), the user's hand is scanned through the camera or three-dimensional scanner of the nail measurement part so that the hand image having a size of 400×400 and the hand position data are acquired.

Next, three-dimensional mesh modelling is performed using the hand position data acquired in the hand imaging step (S1) to validate the data. A value (height data) of an axis Z of the validated three-dimensional mesh data is corrected to a desired size, and image data cleansing for removing the background from the corrected image is performed to extract the hand. After that, the hand edges are extracted from the extracted hand, and then, a nail candidate group is selected through region matching on hand image database.

After the nail position information has been extracted through the analysis of the selected nail candidate group, the nail images and colors selected by the user are mated to the nail position information, and the mated images are converted into the form using printer attribute information and then transmitted to the printer. According to the transmitted information, the printer allows the nail images to be printed directly on the nails, and otherwise, the printer allows the nail images to be printed on the nail stickers or artificial nails. The nail color information is analyzed through a histogram, and if the selected nail colors are erroneously printed, a warning message is displayed.

The nail art apparatus having the above-mentioned configuration is equipped with a communication module capable of remotely upgrading the nail images being printed through a mobile application or web server and providing the information about the nail art for the user who joins as a member.

EXPLANATIONS OF REFERENCE NUMERALS

10: Nail measurement part
20: Touchscreen
30: Printer
31: Printer transfer part 32: Curing part
40: Sticker supplier
41: Sticker rack
42: Rack elevator 42*b*: Rotating bar
42*m*: Rotating bar operating part
43: Horizontal transfer part 43*a* to 43*c*: Sticker transfer roller
50: Artificial nail supplier
51: Nail loader 52: Horizontal artificial nail transfer part
60: Upward and downward transfer loader
61: Product support plate
62: Elevator 62*s*: Screw shaft
62*m*: Motor
70: Payment module
71: Cash inlet 71*o*: Charge outlet
72: Card inlet
80: Hand inlet
90: Controller
S: Nail sticker
A: Artificial nail

The invention claimed is:

1. A nail art apparatus comprising:

a nail measurement part for measuring the shapes of nails inserted through a hand inlet formed on the front surface of a body to obtain data for printing various colors or patterns on the nails;

a touchscreen for displaying shapes and colors of the nails measured by the nail measurement part, displaying nail designs and colors desired by a user, and inputting information of the nail designs and colors;

a printer for printing the nail designs and colors according to the shapes of the nails measured by the nail measurement part;

a sticker supplier for supplying nail stickers selected by the user through the touchscreen;

an artificial nail supplier for supplying artificial nails selected by the user through the touchscreen;

a payment module for receiving payment for the cost of nail art; and a controller for controlling the nail measurement part, the touchscreen, the printer, the sticker supplier, the artificial nail supplier, and the payment module, wherein the sticker supplier comprises a sticker rack on which the nail stickers are loaded, a rack elevator for elevating the sticker rack, and a horizontal transfer part for transferring the nail stickers of the sticker rack moving up through the rack elevator to an outlet or the hand inlet.

2. The nail art apparatus according to claim 1, wherein the printer performs printing in order of base, color, and varnish paints.

3. The nail art apparatus according to claim 1, wherein the artificial nail supplier comprises an artificial nail loader on which the artificial nails are loaded and a horizontal artificial nail transferrer for pushing and transferring the artificial nails loaded on the artificial nail loader to an upward and downward transfer loader located in front thereof.

4. The nail art apparatus according to claim 3, wherein the upward and downward transfer loader comprises a product support plate for supporting the artificial nails pushed through the horizontal artificial nail transfer part and an elevator for elevating the product support plate.

5. The nail art apparatus according to claim 1, further comprising a communication module for performing remote control through a mobile application or web server.

6. The nail art apparatus according to claim 1, wherein a warning message is displayed if selected nail colors are erroneously printed.

7. A nail art method using the nail art apparatus according to claim 1, the nail art method comprising the steps of:

a hand imaging step (S1) of imaging the user's hand through a camera or scanner of the nail measurement part to acquire a hand image and hand position data;

a hand region extracting step (S2) of removing a background region excepting the hand from the data acquired in the hand imaging step (S1) to extract hand edges;

a nail region extracting step (S3) of extracting only portions where nails exist from the hand region extracted in the hand region extracting step (S2) through an image data cleansing program;

a nail position information extracting step (S4) for extracting positions of the nail regions from the image extracted in the nail region extracting step (S3);

an image mating step (S5) of mating images for nail art that are pre-selected by the user to the regions of the nail position information through the position information extracted in the nail position information extracting step (S4); and an image output step (S6) of transmitting image mating data obtained in the image mating step (S5) to the printer to allow the printer to produce the images for nail art.

8. The nail art method according to claim 7, wherein in the hand region extracting step (S2), the hand edges are extracted from the hand region extracted by removing the background region from an image on which a value of an axis Z (height data) of the three-dimensional mesh data validated by three-dimensional mesh modelling is corrected to a desired size.

9. The nail art method according to claim 7, allowing a communication module to perform remote control through a mobile application or web server.

* * * * *